UNITED STATES PATENT OFFICE 2,582,296

PROTECTIVE COVERING OF MUTILATIONS IN BEEF CARCASSES

William R. Sullivan and Patrick J. Cleary, Chicago, Ill., assignors to Armour and Company, Chicago, Ill., a corporation of Illinois No Drawing. Application August 30, 1950, Serial No. 182,398

6 Claims. (Cl. 99—107)

This invention relates to the protective covering of mutilations in beef carcasses. The invention is particularly useful in providing a protective covering for a mutilation involving the removal of part of the carcass and the exposure of lean meat thereunder, and is effective in tightly covering such area without the apparent use of extraneous materials and in such a manner that the carcass appears to be intact.

In packing houses it is common practice to remove portions of the beef carcass because of bruises, grubs, etc., and such removal, which is often done hastily, leaves irregular and unsightly openings in the carcass which exposes lean meat and stand out in sharp contrast to the normal fat-covered exterior of the carcass. Often better grade carcasses are de-graded or de-valued because of such excessive grub holes, gouges, or lean spots. A qualified person is stationed normally at the shrouding operation on the beef-kill floor to mark or tag conspicuously the better grade carcasses that show such excessive grub openings, gouges, or lean spots and which results in a de-grading or de-valuing of the carcass. This is unfortunate, because the carcass is in excellent condition, and the above features which result in the de-valuing thereof result merely from appearance. There has long been a need to provide a simple and inexpensive method for the covering of such openings while at the same time forming such a tight seal that the area covered is protected at all points.

An object of the invention is to provide a method whereby an irregular opening in the carcass can be closed effectively so as to render the surface of the carcass intact in appearance while at the same time causing the added material to adhere permanently to the edge portions of the carcass about the opening, forming a tight seal therewith. A further object is to provide a method for the protective covering of openings in a carcass by grafting or transplanting thereon selected tissue having the property of stretching to cause ready conformation thereof with the edge portions of the carcass about the opening and further of securely adhering to the carcass. Yet another object is to provide a method in which a portion of fatty connective tissue, known as fasciae, and which is elastic and adhesive, is employed for stretching out to tightly cover the surface where the lean meat is exposed due to removal of bruises, grubs, or to careless knife work, so as to effectively seal the surface and to give the carcass the appearance of being intact throughout while at the same time sealing the points of junction between the connective tissue and the edges of the carcass about the opening. Yet another object is to provide for the sealing of mutilated portions of a carcass through the use of a connective tissue having the property of elasticity and adherence and responing to pressure exerted by the shroud or other means for forming an even continuation of the exterior surface of the carcass for the sealing of the opening. Other specific objects and advantages will appear as the specification proceeds.

The provision of a protective covering over an opening in the carcass caused by the removal of a portion affected by bruises, grubs, etc., has long presented a problem. Many suggestions have been tried, and without success. In some cases, an extraneous material is added but this material unfortunately has the tendency to shrink or to change its characteristics, and further does not present a likeness to the carcass portions about it. Further, such materials are impressionable and leave imprints therein or else are substantially inelastic and not tightly adhering. The problem is aggravated by the fact that the meat is exposed to a wide range of temperatures from the time it leaves the killing floor to the time of freezing, etc.

We have discovered that fatty connective tissue, known as "fasciae," may be removed without loss from the chuck, rib, or flank areas of the carcass, and this tissue, which is elastic and adhesive, may be effectively stretched out to tightly cover the surface where the lean meat is exposed or the carcass portion cut away. In cases where the mutilation extends over the lean surface of the meat, such depressions are covered by pressing the tissue into them and smoothing it out. The tissue extends from the exposed lean meat surface to be covered to the surrounding fat surface, covering only to the point required in order to hold the grafting material firmly in place and to completely cover the exposed lean.

The fasciae connective tissue connects the skin to the muscle and contains elastin and fat; the elastin or globulin enabling the tissue to be stretched so as to form a smooth connection with the irregular edges of the carcass about the cut while the fat content provides an adhesive that unites the fibers of the tissue with the fibers of the carcass edge. No tools or devices other than the operator's hands need be used in the grafting work.

After the grafting is completed, the shroud, which is loosely placed on the selected animal on the killing floor, is drawn tightly and smoothly over the treated area and then the entire shroud is rolled, in keeping with the standard practice, to present a smooth appearance to the surface fat of the entire carcass. This completes the operation, and from this point forward, the carcasses are handled in the same manner as all other shipper dressed beef carcasses.

After the shroud is removed at a later stage, it is found that the treated area cannot be detected and the connective tissue applied forms a tight seal along the joined area. The pressure exerted by the shroud is helpful in causing a flow or merging of the tissues at their point of junction with the carcass so that one cannot determine where the carcass tissues end and the fasciae tissues begin. Extraneous material is thus effectively excluded from the recess or opening and the product is in every respect as good a product as a similar grade carcass from which no surface portions have been removed. Since the fasciae connective tissue is of no particular value on the chuck, rib or flank areas of the carcass where the loose skin tissue is most abundant, the cutting of the tissue from these portions and the application thereof to other portions involves no loss in value with respect to such chuck, rib and flank areas.

We prefer that the grafting operation be performed while the temperature of the carcass body is about 90° F. or higher, because at this temperature the sealing of the connective tissues to the carcass is accomplished most effectively. We may use, for example, temperatures ranging from 60° F. to 100° F. The fasciae tissue is somewhat like a cobweb or an opaque skein which has enough elasticity to stretch over and cover the given area and enough plasticity to fill the holes or gouges. At the same time, it contains enough natural fat to give it the needed adhesiveness. The operator, by pressing the edges of the fasciae tissue firmly against the edges of the carcass about the opening, brings about a smooth and tight adherence. However, we have found that it is very desirable and important that the shroud be drawn very tightly and smoothly over the patched area. When this is done, with the shroud tightly in place for twenty-four hours after patching, there is no significant difference in the strength of the patched portion and the adjacent carcass portion. Subsequent severe testing involving wide temperature changes, handling and cutting into retail cuts, demonstrated that the treated portions were in all respects equal to the original, uncut carcass portions. The drawing of the shroud tightly over the grafted portion seems to have a peculiar effect during the 24 hours or 48 hours thereafter in that the tissue flows or adapts itself to the adjacent contours of the carcass and particularly to the edges thereof about the opening, so that an extremely sturdy union is effected, with the connective tissue forming in substance a continuation of the surrounding surfaces and responding to the tests above described in the same way as such surrounding surfaces.

As a specific example, the following may be set out:

A beef carcass having a surface portion thereof cut away so as to expose some lean meat, was taken from the killing floor and treated in the following manner at a temperature of about 89° F. Connective tissue was cut from the carcass along the chuck, rib and flank areas and then applied by hand to the carcass, with the tissue being pressed into the opening so as to fill it and with the edges of the tissue being drawn or stretched into a smooth joint with the edge tissue of the carcass. Because of the extreme elasticity of the web-like fasciae, it is possible to make this tissue blend and fit in with the tissue of the carcass about the edge of the opening or cut-away portion so that there appears to be no break in the exterior appearance of the carcass. The remarkable elasticity of the tissue enabled the operator to thin out the edges of the tissue where it was combined with the tapering edge portions of the carcass, and there appeared to be no substantial overlapping of the tissue so as to form a hump or bulge at the point of joining the tissues. The shroud was then drawn tightly and smoothly around the treated area and then the entire shroud rolled as in the usual practice.

After 24 hours, the shroud was removed and it was found that the applied tissue now had the contour and appearance of the exterior surface of the carcass and appeared to be integral with it, particularly the stretched edges of the tissue united with the edges of the carcass about the opening, blended smoothly therewith, and formed a tight seal.

While, in the foregoing specification, we have set forth a specific process in considerable detail for the purpose of illustrating an embodiment of the invention, it will be understood that such details of the process may be varied widely by those skilled in the art without departing from the spirit of our invention.

We claim:

1. In a process for treating a mutilated beef carcass to provide a protective adhering covering for the mutilation, the steps of applying to an area from which a carcass portion is removed fasciae connective tissue, and pressing the tissue into tight adhering relation to the tissue of the carcass.

2. In a process for treating a mutilated beef carcass to provide a protective self-adhering covering for the mutilation, the steps of applying to an area from which a carcass portion is removed fasciae connective tissue, and stretching the edges of said tissue into a smooth, tight joint with the edges of the carcass about said area.

3. In a process for treating a mutilated beef carcass to provide a self-adhering, protective covering for the mutilation, the steps of applying to an area from which a carcass portion is removed fasciae connective tissue with the temperature of the carcass at about 90° F., and pressing the tissue into tightly adhering relation with said carcass area.

4. In a process for treating a mutilated beef carcass to provide a protective covering for the mutilation, the steps of cutting fasciae connective tissue from lower areas of the carcass and applying said removed connective tissue to a mutilated area in which a carcass portion has been removed, and pressing the connective tissue into adhering relation with the edges about the removed portion.

5. In a process for treating a mutilated beef carcass to provide a protective covering for the mutilation, the steps of applying to an area from which a carcass portion is removed fasciae connective tissue, and tightly drawing a shroud about said area.

6. In a process for treating a mutilated beef carcass to provide a protective covering for the mutilation, the steps of applying to an area from which a carcass portion is removed fat-containing fasciae tissue while the temperature of the carcass is about 90° F., tightly drawing a shroud about the area to which the tissue is applied, and maintaining said area under the pressure of said shroud for a period of about 24 hours or more.

WILLIAM R. SULLIVAN.
PATRICK J. CLEARY.

REFERENCES CITED

The following references are of record in the file of this patent:

UNITED STATES PATENTS

| Number | Name | Date |
|---|---|---|
| 2,214,153 | Williams et al. | Sept. 10, 1940 |
| 2,314,300 | Williams et al. | Mar. 16, 1943 |
| 2,341,199 | Williams | Feb. 8, 1944 |
| 2,371,967 | Lohner et al. | Mar. 20, 1945 |